United States Patent
Smith (10) Patent No.: US 6,338,628 B1
(45) Date of Patent: Jan. 15, 2002

(54) PERSONAL TRAINING AND DEVELOPMENT DELIVERY SYSTEM

(75) Inventor: Robert K. Smith, Dallas, TX (US)

(73) Assignee: Clear Direction, Inc., Dallas, TX (US)

( * ) Notice: Subject to any disclaimer, the term of this patent is extended or adjusted under 35 U.S.C. 154(b) by 0 days.

(21) Appl. No.: 09/504,406

(22) Filed: Feb. 15, 2000

(51) Int. Cl.[7] .............................................. G09B 5/00
(52) U.S. Cl. ..................................... 434/236; 434/350
(58) Field of Search ............................... 434/236, 350, 434/322, 323

(56) References Cited

U.S. PATENT DOCUMENTS

| | | | | |
|---|---|---|---|---|
| 5,551,880 A | * | 9/1996 | Bonnstetter et al. | 434/236 |
| 5,882,203 A | * | 3/1999 | Correa et al. | 434/236 |
| 5,911,581 A | * | 6/1999 | Reynolds et al. | 434/236 |
| 5,954,510 A | * | 9/1999 | Merrill et al. | 434/236 |
| 5,961,332 A | * | 10/1999 | Joao | 434/236 |
| 6,164,975 A | * | 12/2000 | Weingarden et al. | 434/322 |

OTHER PUBLICATIONS

Mark A. Moore, "A Quantum Wave Model of Value Theory," in *Formal Axiology and Its Critics—Value Inquiry Book Series*, ed. Rem B. Edwards, pp. 171–215.

"The Science" from www.zeroriskhr.com, printed Mar. 21, 2001, copyright 2000, ZeroRisk HR, Inc.* http://www.valueinsights.com/axiology.html, copyright 1999 Insight Consulting Inc.* http://www.spannassoc.com/spannn3/services/hartmanvalueprofile.html, "Spann & Associates".* http://www.axelrodlearning.com/valueprofilereports,html, "Value Profile Reports", copyright 1999 Axelrod Learning.* britannica.com "axiology", copyright 1999–2000 Britannica.com, Inc.*

Forms of Value and Valuation: Theory and Application, Lanham, MD.: University Press of America, 1991, pp. 243–289. Copyright John Austin.*

The Journal of Human Relations, vol. 21, No. 1, 1973, published by Central State University, Wilberforce, Ohio by Robert S. Hartman.*

Formal Axiology and the Kinsel–Hartman Profile, Dr. Robert Kinsel Smith, copyright 4/95 Kinsel Enterproses, Inc.*

Candidate Interview Guide, www.dallas.net/~kinsel, printed Mar. 21, 2001.*

* cited by examiner

*Primary Examiner*—Joe H. Cheng
*Assistant Examiner*—Kathleen M. Christman
(74) *Attorney, Agent, or Firm*—Womble Carlyle Sandridge & Rice, PLLC (57) ABSTRACT

A personalized training and development methodology that determines an individual's strengths and weaknesses and automatically provides training and development exercises that focus on reinforcing an individual's strengths and modifying his behavioral weaknesses. An individual logs on to the Internet personalized training and development training website, or an Intranet of his firm or company, and takes the Kinsel-Hartman Profile which includes four or five lists of 18 statements each. Each of the 18 statements in each list of the profile are formal representations of value combinations. An individual ranks all 18 statements in each list which in turn are used to create a profile report. This report presents the person's blended scores of his thinking, combining his bias and capacities concerning each dimension of value. The report also gives a composite of his world thinking and one of his self thinking where all three dimensional orientations are put together into an overview of his perspective. The application software ranks those thinking orientations that serve as strengths and those that serve as weaknesses into an order that determines which training and development reminders are sent to the person and in which particular order. The application software then schedules the sending of those training and development reminders on a periodic basis.

26 Claims, 7 Drawing Sheets

BLENDED CAPACITIES AND BIASES

| BIASES | CAPACITIES | | | | | | | |
|---|---|---|---|---|---|---|---|---|
| | 3 | 4 | 5 | 6 | 7 | 8 | 9 | 10 |
| 0 | 1 | 2 | 3 | 4 | 4 | 5 | 5 | 5 |
| 1 | 1 | 2 | 3 | 4 | 4 | 5 | 5 | 5 |
| 2 | 2 | 2 | 3 | 4 | 4 | 5 | 5 | 5 |
| 3 | 2 | 2 | 4 | 4 | 5 | 5 | 5 | 5 |
| 4 | 2 | 3 | 4 | 5 | 5 | 5 | 5 | 5 |
| 5 | 9 | 8 | 8 | 7 | 7 | 6 | 5 | 5 |
| 6 | 9 | 9 | 8 | 7 | 7 | 6 | 6 | 6 |
| 7 | 9 | 9 | 8 | 8 | 7 | 7 | 6 | 6 |
| 8 | 9 | 9 | 9 | 8 | 8 | 7 | 6 | 6 |
| 9 | 9 | 9 | 9 | 8 | 8 | 7 | 6 | 6 |
| 10 | 9 | 9 | 9 | 8 | 8 | 7 | 6 | 6 |

Fig. 1

| View | Dimension | Code | Description |
| --- | --- | --- | --- |
| World | Intrinsic | I1 | empathic thinking |
| World | Extrinsic | E1 | practical thinking |
| World | Systemic | S1 | structured thinking |
| Self | Intrinsic | I2 | self-esteem thinking |
| Self | Extrinsic | E2 | role awareness thinking |
| Self | Systemic | S2 | self direction thinking |

Fig. 2
Prior Art

STRENGTHS

VALUE DIMENSIONS

| TIERS | I1 | E1 | S1 | I2 | E2 | S2 | TOR | A.B. |
|---|---|---|---|---|---|---|---|---|
| 1 | 7 | 6 | 6 | 6 | 6 | 6 | | |
| 2 | 6-7 | 6-7 | 6-7 | 6-7 | 6-7 | 6-7 | | |
| 3 | 5-7 | 5-7 | 6-8 | 5-7 | 6-8 | 6-8 | A,D | |
| 4 | 5-8 | 5-8 | 5-8 | 5-8 | 6-9 | 6-9 | G | |
| 5 | | | | | 5-9 | 5-9 | G | .3 |
| 6 | | | 5-9 | | | | | 3 |
| 7 | 5-9 | 5-9 | | 4-8 | 4-8 | | H-K | |
| 8 | | 4-9 | | 4-9 | | | | |
| 9 | 7 | 6 | 6 | 6 | 6 | 6 | | |
| 10 | | | | RETURN TO TIER 1 | | | | |

Fig. 3

POTENTIAL INTERFERERS

| TIERS | I1 | E1 | S1 | I2 | E2 | S2 | TOR | A.B. |
|---|---|---|---|---|---|---|---|---|
| 1 | 0-3 | 0-3 | 0-3 | 0-3 | 0-3 | 0-3 | | |
| 2 | 0-4<br>9-10 | 0-3<br>9-10 | 0-4<br>9-10 | 0-3<br>9-10 | 0-3<br>9-10 | 0-3<br>9-10 | | |
| 3 | 0-4<br>9-10 | 0-4<br>9-10 | 0-4<br>9-10 | 0-3<br>9-10 | 0-3<br>9-10 | 0-3<br>9-10 | | |
| 4 | 0-4<br>9-10 | 0-4<br>9-10 | 0-4<br>9-10 | 0-4<br>8-10 | 0-4<br>8-10 | 0-4<br>9-10 | H-K | |
| 5 | 0-4<br>9-10 | 0-4<br>9-10 | 0-4<br>9-10 | 0-4<br>8-10 | 0-4<br>8-10 | 0-4<br>9-10 | | .3 |
| 6 | 0-4<br>9-10 | 0-4<br>9-10 | 0-4<br>9-10 | 0-4<br>8-10 | 0-4<br>8-10 | 0-4<br>9-10 | | .3 |
| 7 | 0-5<br>8-10 | 0-5<br>8-10 | 0-5<br>8-10 | 0-4<br>8-10 | 0-4<br>8-10 | 0-5<br>8-10 | | |
| 8 | 0-4<br>9-10 | 0-3<br>9-10 | 0-4<br>9-10 | 0-3<br>9-10 | 0-3<br>9-10 | 0-3<br>10 | | |
| 9 | 0-4<br>9-10 | 0-4<br>9-10 | 0-4<br>9-10 | 0-3<br>9-10 | 0-3<br>9-10 | 0-3<br>9-10 | | .3 |
| 10 | 0-4<br>9-10 | 0-4<br>9-10 | 0-4<br>9-10 | 0-4<br>8-10 | 0-4<br>8-10 | 0-4<br>9-10 | | .3 |
| 11 | 0-5<br>8-10 | 0-5<br>8-10 | 0-5<br>8-10 | 0-4<br>8-10 | 0-4<br>8-10 | 0-5<br>8-10 | | |
| 12 | 0-5<br>8-10 | 0-5<br>8-10 | 0-5<br>8-10 | 0-4<br>8-10 | 0-4<br>8-10 | 0-5<br>8-10 | | |

PERSONAL TRAINING AND DEVELOPMENT DELIVERY SYSTEM

BACKGROUND OF THE INVENTION

The present invention relates in general to computer-based training and development systems, and more particularly, to a computer-implemented personalized training and development delivery system.

The explosive growth of the Internet over the past few years has resulted in the increasing acceptance by both businesses and consumers of conducting transactions over the Internet. Consumers are using the Internet to enhance their personal and financial lives. These consumers are pressed for time, constantly demanding convenience and 24 hour access to information and services. Commercial business enterprises are increasingly turning to the Internet to offer product and services. The present invention capitalizes on the increasing use of the Internet to deliver personalized training and development reminders to reinforce an individual's strengths in his decision-making capabilities while simultaneously modifying his weaknesses.

A person's decisions and actions involve a factual element which can be seen and objectively measured, and an intangible element which can be felt and known with certainty but may not be immediately or apparently expressible in reasons, facts and causes. The intangibles such as attitudes, likes, dislikes and beliefs are referred to as values. Moreover, these intangibles are usually considered to be subjective, i.e., to be the personal property of those who know the special meaning of the value words. The problem experienced is that each person's values seem to belong to him personally, to be his personal property to which others may or may not have access. Axiology, the science of value, provides a solution to this problem by forming a frame of reference which can be applied to all value situations.

The mathematical and logical structure of value concepts is the cornerstone of axiology. This structure allows the measurement of how a person thinks and perceives, rather than what he or she is thinking or perceiving. In other words, value science tells us what an individual pays attention to in his thinking, what is important to him, and what his biases and prejudices are. Natural science explains human behavior. Axiology explains and measures the thinking processes which form the foundation for, and leads to, behavior.

Conflict occurs when the different perspectives of individuals clash, i.e., because of each individual's uniqueness, a shared or common decision cannot be reached because each individual's problems and priorities are different and because each individual's motivations emphasize different aspects of the same thing. Conflict resolution requires a problem solving technique which incorporates all perspectives into the problem solving process. Axiology is an objective format for measuring intangible attitudes and values. Moreover, axiology measures the level of development and the types of perceptual biases in an individual's thinking. Value science measures the capacity to value and provides a framework for understanding confrontational values.

The distinguishing feature about axiology is that it incorporates a third dimension into the communications and problem solving process. Every individual has certain basic physical traits, abilities and limitations which medical science can measure. The outward expression of these skills is manifested in an individual's behavior, in the way an individual uses these inborn and developed skills to relate to his environment. Human behavior can be observed, categorized and measured. The social sciences focus on the explanation of human behavior. There is a third region which stands between and incorporates the physical attributes and their outward manifestations and behavior. This region is an individual's perception of self and world and the transfer of these perceptions, concepts, and ideas. Value science mathematically defines perceptual capacity and measures the ability to create concepts out of perceptions, i.e., the ability to make value judgments. In effect, axiology measures the why of behavior by measuring the thinking process behind the behavior.

Through axiological analysis, the unique patterns which belong to each individual can be observed and studied in an objective format. An individual's patterns can be compared to those patterns which can belong to other individuals and can be integrated into actual problem situations. The objective evaluation of each person's value patterns serves as a means for helping an individual understand his or her potential for development and the blocks which can inhibit personal growth. As a result, the integrity coming from a person's unique character can be protected. At the same time, the conflicts which can and do occur because of this unique individuality can be understood, and can be prevented or diffused.

While the science of formal axiology addresses areas that are classically addressed by psychology and linguistics, its deductive nature makes it more like physics than natural philosophy. The science of axiology, which was developed by Dr. Robert S. Hartman, is a deductive science of value. It is based on Dr. Hartman's discovery and definition of the three dimensions of value, their specific and distinct properties, the isomorphic relationship of those dimensions to the concept of sets in transfinite set theory, and the modeling of human decision making with the mathematical models.

The three dimensions of value are the cornerstone of the science. Just as distance and time had to be defined and quantified in order to develop a formula for velocity, so too, the dimensions of value had to be defined and quantified to develop a formula of decision making. Dr. Hartman deduced that the properties of those three dimensions of value (the three ways that things, people, and individuals can be known) had properties that were identical to the three sets of transfinite set calculus. This is similar to a physicist modeling a driver of a car trying to keep a car on the exit ramp of a super highway. The physicist can model the trajectory of a car with the mathematics of physics without the car ever existing or without ever seeing or driving a car.

An example of a deductive process will be trying to predict defined behavior of a sub-group of American, male executives between the ages of 33 and 48, making more than $75,000.00. A person fitting into this group would have probabilities assigned to certain other observed behaviors that are consistent with a certain percentage of the members of this group. So through inductive reasoning, an assertion can be made that there is a 50% chance that the given individual found in this group drives a leased BMW or Mercedes Benz. This is a beneficial discipline, because it permits a social scientists to develop general understanding of certain groups and population. Its limitation is that every aspect of this measurement is relative to other aspects. This results in the applications being culturally and temporally limited.

Dr. Hartman categorized the dimensions of value into systemic, extrinsic, and intrinsic. Systemic value is the dimension of formal constructs; the ideas of how things should be. This dimension is one of definitions or ideas, goals, structured thinking, policies, procedures, rules, and laws. If a person values someone or an object systemically, then that person or object has to fulfill the idea perfectly. There is no middle ground for partial fulfillment in systemic value. The concept is either perfectly fulfilled or not fulfilled at all. Thus, systemic dimension is a very limited dimension. The mathematical properties of this dimension are finite sets and finite elements, i.e., there are a limited number of choices and a limited number of properties for the particular object in question. Too much attention to this dimension results in behavior that is too focused on doing things by the book, a preoccupation with planning and having things done perfectly, a tendency to measure everything and everyone against a preset idea of how they should be, and an inability to be comfortable with changes, unpredictable opportunities, and surprises. When a person ignores this dimension, the resulting behavior is an unwillingness to submit to policies and rules imposed from the outside, a skepticism about the value of spending time and money planning for the future, an inability to hold others to standards and literal agreements, an impatience with processes, and an uneasiness when systems are in place and running smoothly.

Extrinsic value is the dimension of abstracting properties and then comparing things to each other. This is the dimension of comparisons, relative and practical thinking. It includes the elements of the real, material world, comparisons of good/better/best, and seeing things as they compare with other things. This is the dimension of seeing things and their properties as they apply to practical situations. To value a person extrinsically is to compare that person in relation to other persons. This dimension is one of results and common sense thinking, tactical planning, role satisfaction and social fulfillment. This is the primary dimension of business. Mathematically, this dimension includes infinite possibilities that can be distinguished from each other (denumerably infinite sets). However, for each comparison a limited number of characteristics apply (a finite number of elements or properties). When a person is too attentive to extrinsic value, the resulting behavior will be an overemphasis on getting things done now, a tendency to see other people as practical and political commodities, and a need for things to be changing constantly, getting visible results, and moving forward. When a person does not pay enough attention to extrinsic value, the resulting behavior will be a tendency to avoid unpredictable situations, a discounting of the energy and effort required to get something accomplished, and an avoidance of the fulfilling of social norms and values. These people do not like political dynamics, relative comparisons, or risk.

Intrinsic value is the dimension of uniqueness and singularity. Intrinsic value is the valuing of an object or person with an eye toward its singularity, uniqueness, essence, or spiritual being. When describing or valuing persons or objects in this dimension, one becomes personally involved with the object/person. There is a self-giving to the object/person which is not present in valuing extrinsically or systemically. The object/person is being valued and recognized as irreplaceable because it is seen as unique. Intrinsic valuing is the act of personally relating, empathizing, sympathizing, or intuitively feeling. It is a focus on the wholeness of the person or thing. Mathematically, this dimension includes infinite properties which are not able to be separated from each other. The mathematics of the intrinsic value is one of non-denumerably infinite sets with infinite elements (unlimited possibilities that cannot be individually identified with an unlimited number of elements concerning the person or object in question). This dimension is the richest of the three in its properties. When a person pays too much attention to intrinsic value, he will be overly attentive to the good in others, have a tendency to avoid putting others in uncomfortable positions, and sense a need to have his feelings satisfied in order for a decision to be a good decision. When a person pays too little attention to intrinsic value, the resulting behavior will be suspicion of the intentions of others, a tendency to see others functionally or as part of a system (instead of treating people as unique individuals), and a distant, protected or cold behavior when relating to others one-on-one.

As noted above, formal axiology identifies three dimensions of value. Each of the dimensions applies to both a world perspective and a self-perspective. Therefore, six major aspects of a person's thinking exist, three about the world view and three about the self view. The Hartman Profile measures two different aspects of a person's thinking concerning each of the six value dimensions. These are capacities to value (called dim scores by Dr. Hartman) and biases for or against that dimension (called valences by Dr. Hartman). A person's capacity to value can be likened to the resolution of the image the brain forms concerning things in that dimension of value. When the resolution is high, precise or sharp, then the person's ability to proceed and make judgments is high. When the resolution or capacity to value is low, then that person has a difficult time being precise or forming definitive judgments in that value dimension. A high capacity enables the person to be able to see pertinent input in that value dimension, process that input along with other data in that dimension, and form a judgment in light of the new data. Capacities are that which determine a person's ability to be reasonable (high capacity) or his propensity to rationalize (low capacity).

A person's bias for or against a particular value dimension is his negative or positive orientation concerning things in that particular dimension. Biases are the indication of the manner of skewing that a person does concerning each value dimension.

Both the capacity and the bias affect a person's choices, decisions, judgments and behaviors. It is the behaviors of people that are seen as strengths and weaknesses, and that which training and development programs seek to reinforce or alter. The reason that these two scores must be consolidated into one score is that they both affect a person's behavior and choices and do so in relation to each other. By blending these two scores into one, simple and effective comparisons of the different value dimension scores can then be made and both aspects (capacities and biases) are appropriately included in the assigning of behavioral descriptions.

SUMMARY OF THE INVENTION

It is an object of the present invention to provide a personalized training and development methodology that determines an individual's strengths and weaknesses and automatically provides training and development exercises that focus on reinforcing an individual's strengths and on modifying his behavioral weaknesses.

An individual logs onto the Internet portal website of the personal training and development delivery system, or an Intranet of his firm or company, and takes the Kinsel-Hartman Profile. The individual is required to enter a company/firm code and password to enter the portal website and then must enter his own code and password. The individual enters his e-mail address so that his report and training/development reminders can be sent directly to him. The individual takes the Kinsel-Hartman Profile which comprises four or five lists of 18 statements each. The first two lists were developed by Dr. Robert Hartman. The other lists were developed by Dr. Robert K. Smith, the inventor of the present invention. The task is to compare the 18 statements or phrases in each list and rank them from best to worse. Through the user interface provided by the application, an individual moves the statements up and down the page until he is satisfied with the ordering. Once all four or five tasks have been completed, the participant sees the last page of the program that indicates where his Personal Profile report will be electronically mailed to him. The first four lists are invariant. The fifth list varies depending upon the professional application, i.e., attorney, accountant, manager, sales, customer service, etc.

Each of the 18 statements in each list of the profile are formal representations of value combinations. An individual ranks all 18 statements, he does not do so according to the intention of the words or phrases, but rather he ranks them based on the meaning that each of the statements has to him (the extensions). Therefore, the Kinsel-Hartman Profile provides a model of how a person arrives at meaning and gives a way to compare his extensions with the axiological intentions. It is these axiological values for each of the statements that enable the mathematical ranking of the statement according to their intentions. It is these rankings that are used as a guide to analyze the participant's rankings. The electronic mailing of the profile results are sent automatically using commercially available electronic mail software packages. The Profile Report is approximately 60 pages segmented into four parts: strengths, orientation toward the world, orientation about one's self, and potential interferers to success. This report presents the person's blended scores of his thinking, combining his bias and capacities concerning each dimension of value. The report also gives a composite of his world thinking and one of his self thinking where all three dimensional orientations are put together into an overview of his perspective.

The application software not only compiles and sends the person's Profile Report, it also ranks those thinking orientations that serve as strengths and those that serve as weaknesses into an order that determines which development reminders are sent to the person and in which particular order. The application software then schedules the sending of those training and development reminders.

In a variant of the above, instead of sending electronic mail messages containing the Profile Report and the training and development exercises, the application software can perform the same assigning and sending of reminder electronic mails for the person to check the portal web page for his next training and development reminder. The only distinction between this method and the previously described method is that the person goes to the portal site to get his next reminder and exercise instead of the reminder itself being sent to him directly. The processing logic associated with selecting which aspects of a person's thinking to refer to first is as follows:

1. affirm the person's thinking orientations or abilities that provide the greatest sources of success;
2. appeal to the person's knowledge that no one is perfect, that everyone benefits from sound counsel, and thereby set up a receptivity for future addressing of thinking orientations or inabilities that lead to problems or unwanted results; and
3. as the training continues, reinforce those areas of thinking strengths and continue to address those orientations that lead to the greatest errors in judgment.

BRIEF DESCRIPTION OF THE DRAWINGS

The invention is better understood by reading the following detailed description of the preferred embodiment in conjunction with the accompanying drawings, wherein.

DETAILED DESCRIPTION OF THE PREFERRED EMBODIMENT

The Kinsel-Hartman Profile comprises four or five tasks, each of these tasks requires that the person put 18 statements in order from best to worse. Each statement is a combination of two dimensions; a dimension to a power of another dimension. Dr. Hartman distinguished between what a thing actually is and how we understand it. The former is the intention of the object, the latter is the extension of the object.

The Kinsel-Hartman Profile differs from the Hartman Value Profile in that it adds two (in some cases three) tasks to the Hartman Profile. Statistical studies show that the randomness of a person's answers can be reduced dramatically if that person repeats a particular action the same way two times. In the case of the Hartman Value Profile, a person is asked to rank two lists of eighteen statements, one indicating that person's perspective on the world and other people, and the second one indicating that person's perspective on himself. The Kinsel-Hartman Profile provides a second world-orientation and a second self-orientation list. This provides a higher degree of reliability in the respondent's resulting report, because randomness is reduced significantly.

Each of the eighteen statements on each task represents a different value combination, with nine being values to the positive power of a valuation (called compositions) and nine being values to the negative power of a valuation (called transpositions). A composition is the appropriate application of a value upon another value. A transposition is the inappropriate application of value upon another value. With each list of eighteen statements, six intrinsic values, six extrinsic values, six systemic values, and six of each valuation are generated. These in turn are assigned mathematical values that provide an objective means by which the statements can be ranked axiologically.

The eighteen value combinations in axiological/mathematical order are:

1. intrinsic valuation of an intrinsic value;
2. intrinsic valuation of an extrinsic value;

3. intrinsic valuation of a systemic value;
4. extrinsic valuation of an intrinsic value;
5. systemic valuation of an intrinsic value;
6. extrinsic valuation of an extrinsic value;
7. extrinsic valuation of an systemic value;
8. systemic valuation of an extrinsic value;
9. systemic valuation of a systemic value;
10. systemic disvaluation of a systemic value;
11. systemic disvaluation of an extrinsic value;
12. extrinsic disvaluation of a systemic value;
13. extrinsic disvaluation of an extrinsic value;
14. systemic disvaluation of an intrinsic value;
15. extrinsic disvaluation of an intrinsic value;
16. intrinsic disvaluation of a systemic value;
17. intrinsic disvaluation of an extrinsic value; and
18. intrinsic disvaluation of an intrinsic value.

The statements on the Kinsel-Hartman profile are representative of these value combinations. By having a person rank those statements, he is providing the analyst with an ordering of value combinations. This ordering provides a model of how that person thinks about things because the ordering will demonstrate which properties that person favors (gives those compositions good rankings and those transpositions poor rankings) and which ones he does not favor. When a statement that is rich in extrinsic properties is compared to a statement that is rich in intrinsic properties by a person who favors intrinsic properties, that person will rank the statement rich in intrinsic properties as better than the extrinsically laden one because the intrinsic one is rich in properties that he favors while the other statement is void of those intrinsic properties. It is common for people who are very sympathetic towards others (intrinsic orientation) to view a concept such as "an assembly line" as a bad thing, i.e., rich in extrinsic and systemic properties, because it appears to be so void of intrinsic properties; boring, demeaning, poor quality of life of those working on the assembly line, etc.

The second aspect of a person's thinking that is modeled by the forced rankings is what Dr. Hartman called a person's "capacity to value." This is determine by summing the absolute values of the differences between the respondent's rankings and the axiological ranking for each of the three dimensions. Therefore, if a person ranks all of the intrinsic value statements close to the axiological rank, then that person is not distracted by other aspects when thinking about or considering intrinsic values. If on the other hand, that same person had rankings of systemic values that vary considerably from the axiological ranks, then that person has demonstrated that he gets distracted by other aspects when considering systemic values.

This measurement of one's capacity to reason can be likened to the resolution of a computer screen. When the screen is of poor resolution, then the person has a hard time being definitive as to whether a number on the screen is a 6 or an 8. When the resolution on the screen is very high, then the person is able to be definite and accurate as to what the exact number is. When the sum of the absolute values of the differences is high, then that person has a hard time seeing clearly in making definitive judgments concerning things in those particular value dimensions. When the sum is low, then that person is readily able to see the differences and make judgments concerning things in that value dimension. The Kinsel-Hartman Profile gets the person to evaluate each of the value combinations in relationship to each other and thus provide a model of his value structure —both biases and capacities.

Biases are identified by summing the differences between the respondent's ranking for statements in the particular dimension and the ranking assigned by the principles defined by Dr. Robert Hartman. When the total sum for the particular value dimension is positive, then the bias is deemed to be positive and the choices, orientations, and decisions favor things with those value properties. When the total sum is negative, then that person's behaviors, decisions, and orientations are consistent with a negative or ignoring orientation concerning things with those properties. In both cases, the more extreme the bias, the stronger the bias, provided that both capacities are the same (a 100% positive bias is more extremely positive than a 75% positive bias). The bias scores assigned to the bias percentages are summarized in Table 1.

TABLE 1

| BIAS SCORE | POSITIVE BIAS PERCENTAGE |
| --- | --- |
| 1 | <10% |
| 2 | 10%–19% |
| 3 | 20%–29% |
| 4 | 30%–40% |
| 5 | 41%–50% |
| 6 | 51%–60% |
| 7 | 61%–70% |
| 8 | 71%–80% |
| 9 | 81%–90% |
| 10 | >90% |

Capacities are identified by summing the absolute value of the differences between the respondent's rankings and the axiological rankings. Each page of the profile has each dimension represented six times (18 statements per page). When a person's ranking of the statements representing a particular value dimension is close to the axiological rank, then that person's capacity to value things with those value properties is very great. On the other hand, great differences are an indication of the respondent's having ranked the items of that value dimension with a great variance from the axiological ranks. Behaviorally, this indicates that the respondent was distracted from, or fixated upon, particular value properties, thus indicating a fuzzy or unclear mental image when thinking about these particular properties. Dr. Hartman used the direct sum of the absolute value of the differences resulting in lower numbers indicating higher capacities; the inventor, on the other hand, uses higher numbers to represent higher capacities. The correlation between the dim score of Dr. Hartman, the capacity of Dr. Smith and a corresponding description is provided in Table 2.

TABLE 2

| Dim | Capacity | Description of Clarity |
| --- | --- | --- |
| 0, 1 | 10 | razor sharp |
| 2, 3 | 9 | outstanding clarity |
| 2–6 | 8 | excellent clarity |
| 7–9 | 7 | very good clarity |
| 2–13 | 6 | good clarity |
| 2–19 | 5 | fuzzy clarity |
| 2–25 | 4 | foggy clarity |
| >25 | 3 | blind, unable to form a clear concept |

Figure 1:
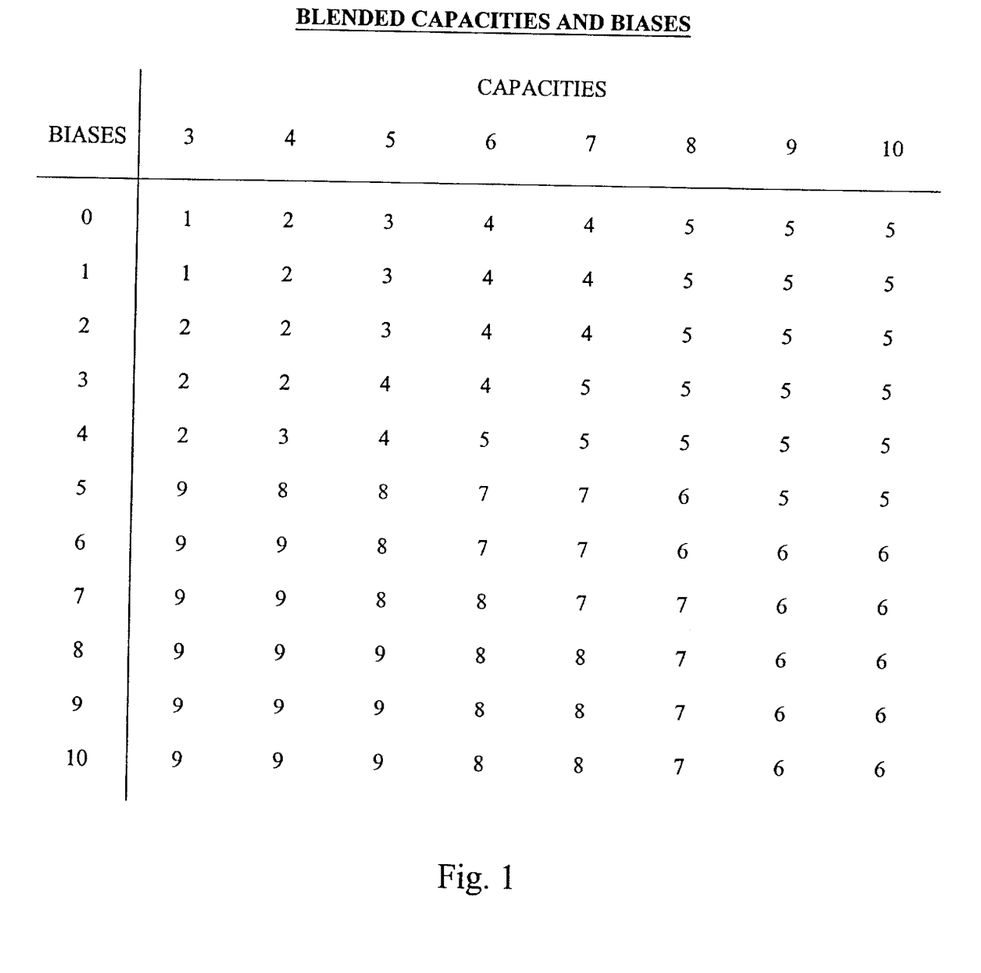
FIG. 1 illustrates a matrix that consolidates capacities and biases in accordance with a preferred embodiment of the present invention.

When a person has a high capacity (clarity) then the effect of his bias in that particular dimension is reduced because of a high degree of reasonability, i.e., his ability to see past the bias. When the person's capacity is low, then the effective bias increases because the person is unable to easily consider alternatives other than those that fit his particular bias. The consolidation of biases and capacities are assigned according to the matrix illustrated in FIG. 1. A description of the combined capacity and bias scores is as follows:

1–3 skeptical about and unable to consider things being good in this dimension;

4–5 inattentive with some ability to consider and reason about this dimension;

6 clearly focused with a balanced orientation;

7–8 attentive to that dimension with good ability to reason;

9–10 fixated on that dimension and not readily able to reason about alternatives.

Combining the capacity and bias scores provides two benefits. The scores for the six major dimensions are blended to reflect the behavioral results stemming from the person's capacities and biases, and are blended in order to be able to quickly and easily compare the scores of the different dimensions. This provides a framework from which comparisons can be made. These scores then make it easy to identify those dimensions that the person is most likely to ignore, rationalize, fixate, or be unable to form judgments.

There is skepticism concerning the Kinsel-Hartman Profile to begin with because of its unusual characteristics, because the statements on the tasks are formal representations of dimensions of value and therefore do not appear to add significance to what they are measuring, and because most people resist training and development suggestions that address or point out their weaknesses or liabilities. Furthermore, people are prone to want to retain the status quo, therefore for change to take place, some motivation or reason to change is required. In order to make an electronic development process effective, the participant's skepticism must be overcome and the person's natural sources of "want to" must be tapped. The most effective way to get a person to want to do something is to affirm that which he holds to be good and true about himself. When what is most important to a person is affirmed, then he is more willing to hear or read what he thinks is important for him to consider changing.

A person's highest clarities is a dimension in which his thinking is the clearest. In this dimension, the person has the least apprehension or is not confused thinking about things. An individual is able to think clearly about other viewpoints without getting emotionally sidetracked or distracted by irrelevant issues. This is the dimension which an individual is most willing and able to discuss objectively with others. Impatience may arise when an individual is discussing things in this dimension with a person who does not have the same clarity.

An individual's lowest clarities is the dimension in which his thinking, at the time of taking the Kinsel-Hartman Profile, is most clouded or fuzzy. This dimension is the one in which the individual has the hardest time making quick, clear, rational and objective judgments. When someone challenges an individual's decisions or actions as they relate to this dimension, the individual will be more emotional than when other dimensions are being challenged. This is the dimension for which the individual is most inclined to resort to his feelings, because he has the most difficult time processing thought in this dimension.

When a person's three self or world clarities are the same, his thinking is balanced. This means that his thinking is equally clear in each of the three dimensions. The result is a balance and sense of well being that an individual experiences internally and that others experience when they are around him. It means that a person can think with equal ease in any of the three dimensions, and therefore, discuss and interact about all three dimensions with equal objectivity. When this balance exists in an individual's world scores, it reflects a sense of well being about the world. When this balance exists in an individual's self scores, it indicates a sense of well being about one's self. A simple example of balance and well being in real life is a person who is ambidextrous, i.e., able to use either hand equally well. Ambidextrous people do not get frustrated when packages are held in their right arm and they have to unlock a car door with keys in their left hand. They do not experience frustration in contexts that non-ambidextrous people do because they are able to go with whatever presents itself with equal ease.

The following principles of clarities are utilized in the present invention.

1. people prefer to think with their highest clarities;
2. individuals do not see what others mean when they address areas regarding the individual's lowest clarities;
3. when all of an individual's clarities are high, any clarity that is low is exaggerated;
4. the lower the clarity, the stronger the bias; and
5. an individual rationalizes most often in his lowest clarities.

When an individual thinks, he naturally looks for and sees the good in things which are in those dimensions in which he has positive biases. He also looks for problems in those things which are in dimensions for which he has negative biases. Therefore, the individual is naturally optimistic and positive about some things and naturally skeptical or biased about other things.

Biases are actually imbalances in an individual's thinking. The bias score indicates that an individual has one type of thinking in comparison to other types of thinking (scores from 5–10 are positive biases). Biases are why an individual makes decisions that look balanced to him, but in fact are lopsided towards particular dimensions.

The principles of biases that are utilized in the present invention are as follows:

1. positive biased dimensions must be satisfied, or the decision, choice or action will not be seen as good to that person;
2. a negative, inattentive bias indicates that the person does not look for or see the good that comes from things in that dimension;
3. positive biases join together to reinforce a person's believing that he has an accurate perspective, which can blind the person to other considerations when making decisions; and
4. a negative bias enables a person to give more energy or attention to his positive biases.

All other things being equal, a positive bias in a systemic dimension is stronger than one in an extrinsic dimension, which is stronger than one in an intrinsic dimension.

Biases and clarities affect each other in a number of ways. The important principles to remember in understanding how biases and clarities work together are:

1. an individual needs the positive biases to be fulfilled; and
2. an individual prefers to use his clearest clarities.

When an individual's highest clarity is also a positive bias, he will be especially strong in that area because he is optimistic about it and likes to develop skills in that area.

When an individual's bias is positive, but his clarity is low, he will want those things to be fulfilled (positive bias), but he will not be the one who does them. When an individual's bias is negative and his clarity is high, he will use that thinking (high clarity) to see the downside of paying attention to that dimension. Finally, when an individual's bias is negative and his clarity is low, he will avoid things in that dimension whenever possible. These are the areas in which an individual will be most emotional, most defensive, and rationalize the most.

Strengths come from either a positive bias or a high capacity. Because a positive bias indicates a positive orientation toward things with those properties, it also indicates things from which the person gets energy or that he likes to be dealing with. Therefore, the person will naturally gravitate toward those things and pay attention to things pertaining to that value dimension. When people pay attention to particular dimensions, they develop expertise, experience, and maturity regarding that dimension because of the practice and attention. When a person ignores a particular dimension, then he remains immature because of the constant avoiding of those things. While the avoiding of, or skepticism, concerning things in a particular dimension can be an asset or desirable orientation in certain contexts, it is not appropriate to define that skepticism as a strength.

Figure 2:
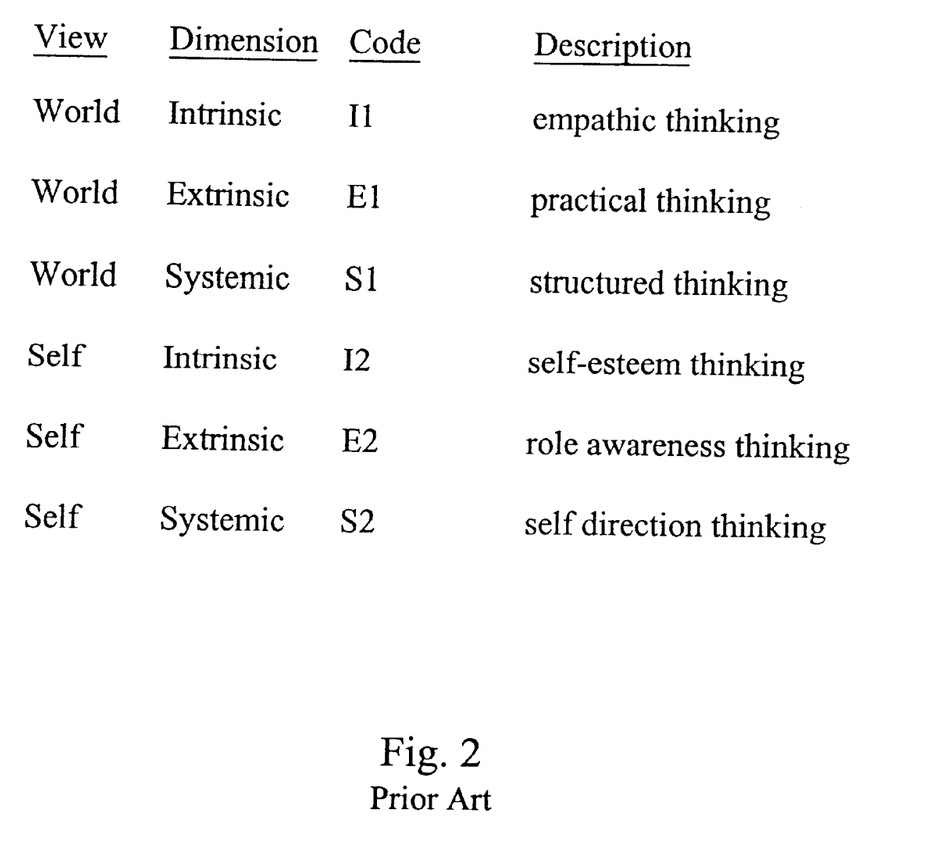
FIG. 2 illustrates the six major aspects of an individual's thinking including three world view and three self view aspects in accordance with a preferred embodiment of the present invention.
Figure 3:
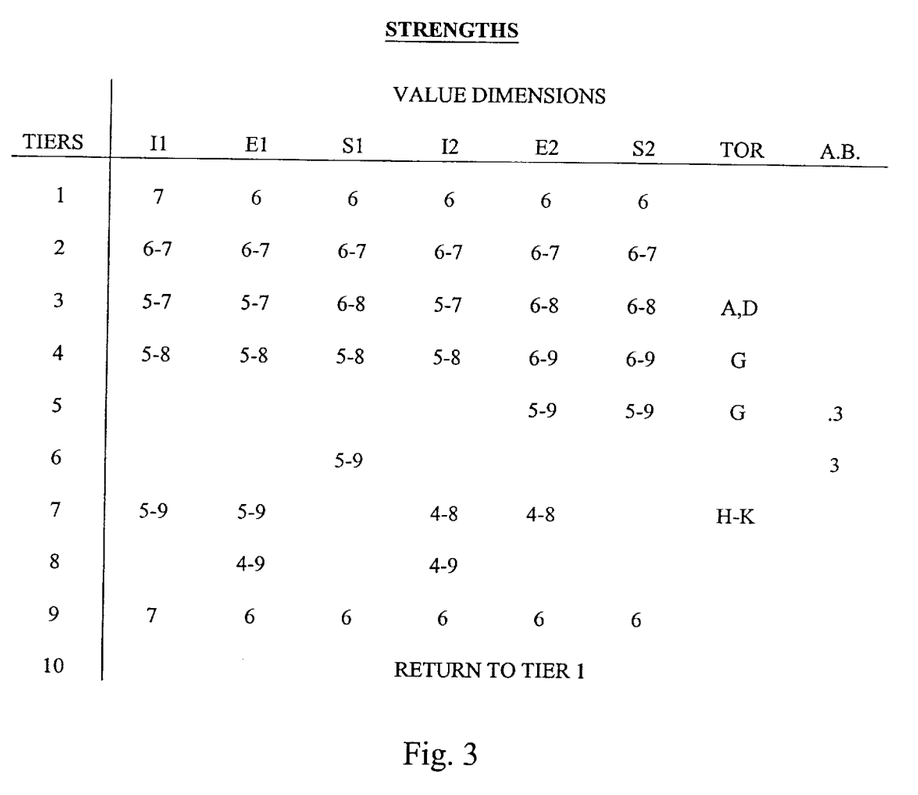
FIG. 3 illustrates a strength matrix in accordance with a preferred embodiment of the present invention.

FIG. 2 depicts the six major aspects of a person's thinking—three about the world view and three about the self view. The codes in the third column are used in the strength matrix for the individual as illustrated in FIG. 3.

In order to prioritize strengths in relation to each other, different weightings must be established for each of the value dimensions and for each of the capacity scores. For example, a score of 7 is better than a score of 5, but it must be determined how much better and how much more attention should be given to the dimension with a score of 7 than the dimension with the score of 5. Therefore, the first ordering is to "tier" the strength scores as shown in FIG. 3. The second ordering applied to the development of this ranking is the knowledge about the different scores as they are perceived by the respondent. In FIG. 3, the I1 (empathic thinking) score for tier 1 is 7 whereas all of the other value dimensions have a score of 6 in tier 1. This is because people with a 6 in the I1 dimension do not consider it a greater strength than a 6 in the other dimensions, whereas those with a 7 in the I1 dimension do consider that to be their greatest strength.

This ordering is based on two things observed by the inventor. Those strengths that are the greatest are the ones that a person is most attentive to and familiar with and how he usually identifies himself. Therefore, the best departure point in encouraging a person and eliciting engagement in the process is to affirm that which he is clearly cognizant of and provide reminders that utilize those strengths. Secondly, when people are equally strong in multiple areas, the reminders start with those strengths that have the most obvious business or professional application. This way the exercises and reminders are better able to be applied, since the context of the program is professional development.

The electronic mail/portal reminder program is designed to begin with the person's greatest areas of strength and thereby win the person's confidence and participation. At the same time, the logic identifies the person's greatest weakness in thinking and begins the process of helping the person understand how his thinking skews his decision making. Each area of weakness is introduced with its positive attributes and then described as to how it misses the mark. When one strength or weakness is significantly greater than others, then they receive the greatest number of reminders. No one strength or weakness will get sole attention, rather the program is designed to bring breadth to the participants' attentions to both their strengths and weaknesses.

The application software assigns an individual a vector of training and development reminders based on his personal profile report which was electronically mailed to the individual after logging onto the web server site to take the Profile. The areas of greatest strengths are assigned according to the schedule depicted in FIG. 3. I1, E1, S1, I2, E2 and S2 are as defined in FIG. 2. TOR represents "types of reasoning" and is a measure of how many compositions are ranked worse than transpositions. A.B. is "attention balance", i.e., the overall balance of the differences in the scores concerning the world thinking in relationship to the self-thinking. Each of these combined units receives a distinct file name that contains training, reminders, suggested reading, and cases that encourage the person to use and master the strengths.

By starting at the upper left corner and proceeding to the end of the row and then proceeding to the next tier from left to right and repeating that process until reaching the S2 score of 6 in tier 9, all of the possible sources of strength are covered. In a program that is designed to engage the participant on at least 16 different occasions over a period of at least four months, one critical aspect is that every significant strength be highlighted, and that significant strengths be highlighted more than less significant strengths, and that at least 16 different highlightings are covered for any given participant. Thus, whether the participant has one 6 or 7 score or has 5, each must have a review that balances and highlights those in light of the individual's other scores.

The following examples illustrate the use of the strengths matrix in FIG. 3 by the application software to provide training and development exercises and reminders to a participant. The scores in the following examples are presented in the following order: I1, E1, S1, TOR, I2, E2, S2, AB.

EXAMPLE 1

Participant A's Profile scores are 7, 4, 8, (TOR=C), 5, 7, 9 (AB=1.7). The order of the strengths would be as follows:

| Tier 1 | I1 |
| Tier 2 | I1, E2 |
| Tier 3 | I1, S1, I2, E2 |
| Tier 4 | I1, S1, I2, E2, S2 |
| Tier 5 | I1, S1, I2, E2 |

EXAMPLE 2

Participant B's Profile scores are 5, 8, 7, (TOR=A), 6, 3, 7 (AB=0.3). The order of strengths would be as follows:

| Tier 1 | I2 |
| Tier 2 | S1, I2, S2 |
| Tier 3 | I1, S1, I2, S2 |
| Tier 4 | I1, E1, S1, I2, S2 |
| Tier 5 | I1, E1, S1 |

EXAMPLE 3

Participant C's Profile scores are 7, 4, 9 (TOR=C), 3, 3, 9 (AB=1.7). The order of strengths would be as follows:

| Tier 1 | I1 |
| --- | --- |
| Tier 2 | I1 |
| Tier 3 | I1 |
| Tier 4 | I1, S2 |
| Tier 5 | I1, S2 |
| Tier 6 | I1, S1, S2 |
| Tier 7 | I1, S1, S2 |
| Tier 8 | I1, E1, S1 |

In this last example, the I1 score of 7 is reviewed eight times (in weeks 1, 2, 3, 4, 6, 8, 11, 14), the S2 score of 9 is reviewed four times (in weeks 5, 7, 10, 13), the S1 score of 9 is reviewed three times (in weeks 9, 11, 16), and the E1 score of 4 is reviewed once (in week 15).

Figure 4:
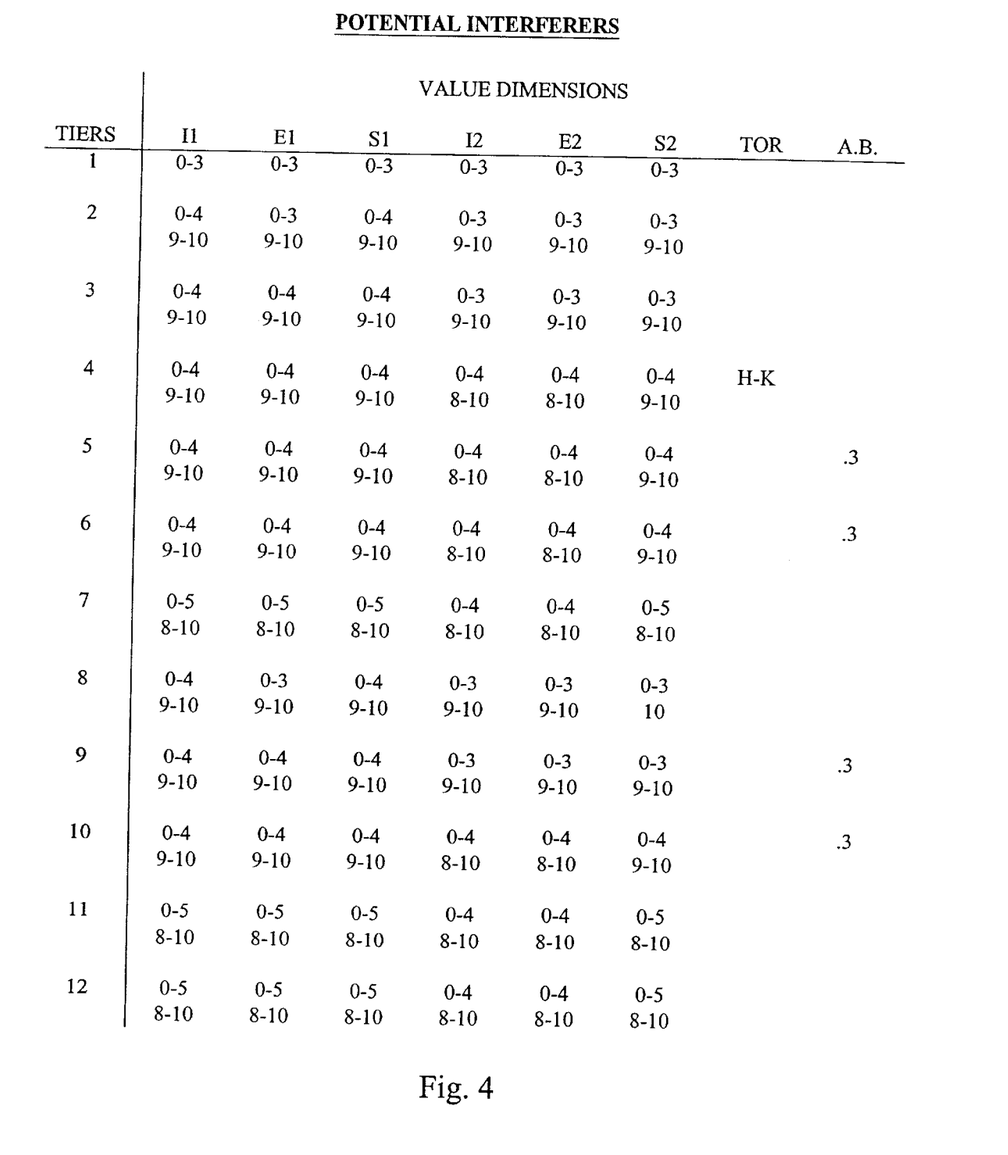
FIG. 4 illustrates the potential interferers to success matrix in accordance with a preferred embodiment of the present invention.

The logic of the application software then assigns a weakness or potential interferer to success to each weekly reminder as well. Each of these combined units also receives a distinct file name that will contain training, reminders, suggested reading, and cases that will encourage the person to work on coping strategies and growth in these areas of vulnerability. The potential interferers to success matrix is depicted in FIG. 4. The following examples again illustrate the process.

EXAMPLE 1

Participant with scores of 7, 4, 5, B, 4, 7, 8, 3. The order of weaknesses addressed would then be as follows:

| Tier 3 | E1 |
| --- | --- |
| Tier 4 | E1, I2 |
| Tier 5 | E1, I2 |
| Tier 6 | E1, I2 |
| Tier 7 | E1, S1, I2, S2 |
| Tier 9 | E1 |
| Tier 10 | E1, I2 |
| Tier 11 | E1 |

EXAMPLE 2

Participant with scores of 8, 4, 8, A, 4, 7, 8, 1.7. The order of weaknesses addressed would then be as follows:

| Tier 3 | E1 |
| --- | --- |
| Tier 4 | E1, I2 |
| Tier 5 | E1, I2 |
| Tier 6 | E1, I2 |
| Tier 7 | I1, E1, S1, I2, S2 |
| Tier 9 | E1 |
| Tier 10 | E1, I2 |
| Tier 11 | E1 |

These weekly reminders are either sent to the person's electronic mail inbox that he assigned when he logged in to take the Kinsel-Hartman Profile, or is triggered and displayed when the person accesses the web portal site and enters his personal identification code. In either case, the application software keeps track of which files have been accessed and then presents the next files according to the preceding logic, until 16 development reminders of both strengths and weaknesses have been delivered.

The order of the reminders is determined by the difference between the intentional value and the individual's extensions. Strengths (natural sources of success) are those thinking orientations that are most accurate or where the extensional meaning is closest to the actual meaning. These are the areas in a person's life that result in the least conflict or stress because the person is operating from the most accurate mental image. These areas are the areas that a person experiences the greatest, most consistent success, both professionally and personally.

The order of the weaknesses reminders is exactly the opposite. The thinking orientation (i.e., combination of bias and clarity) that is farthest from reality is the greatest source of stress, anxiety, frustration, conflict and failure that person has. These areas are the precipitators of the greatest pain in the person's life.

The weekly reminders program is designed to:
1. increase the person's awareness of his natural strengths and areas of vulnerabilities;
2. provide encouragement and specific exercises, readings, cases, reminders, and examples for the person to grow in his confident and appropriate use of his areas of strengths;
3. provide clear direction concerning those areas in which the person is most vulnerable, likely to err in judgment, likely to face difficulty or frustration, most likely to rationalize, and/or most likely to be defensive and thereby miss needed help; and
4. do so in a format that results in the person completing the program and gaining the most from the program.

Figure 5:
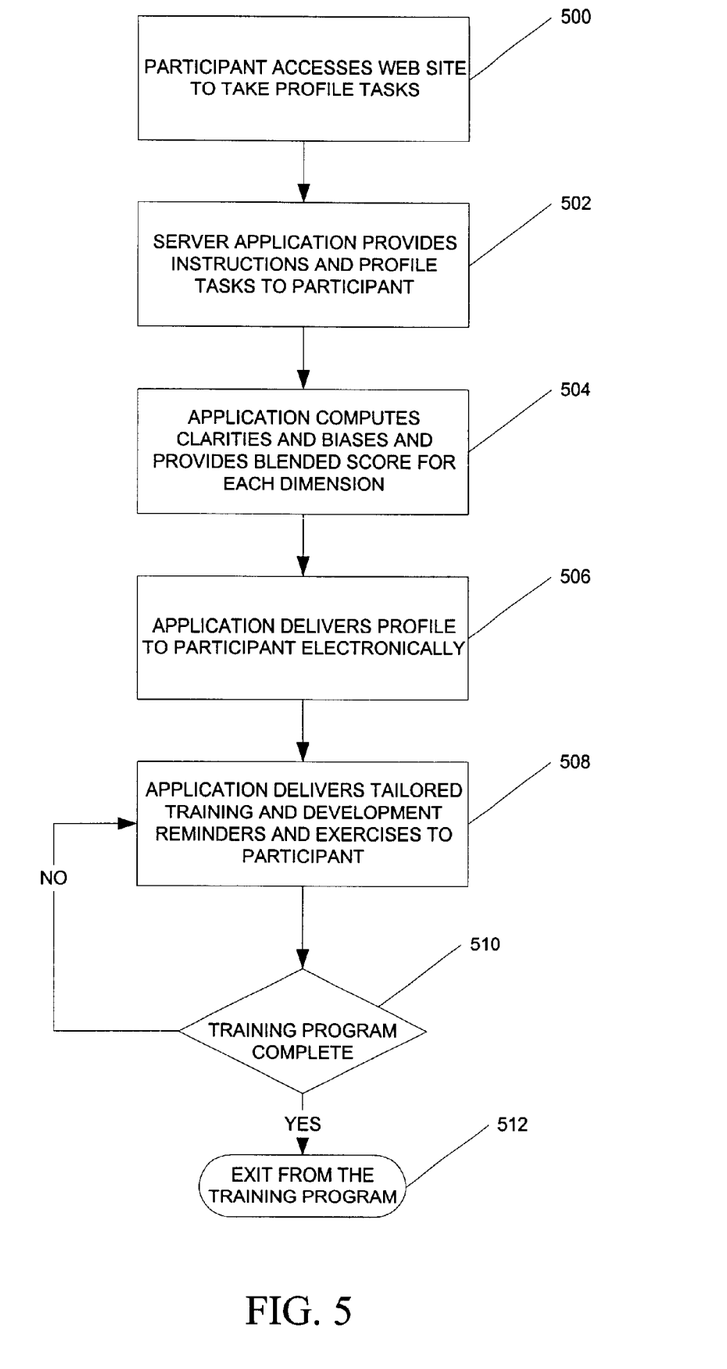
FIG. 5 illustrates the processing logic associated with a preferred embodiment of the present invention.

FIG. 5 illustrates the logic corresponding to the personal training and development delivery system. In logic block 500, the participant accesses the personal training and development delivery system website to take the Kinsel-Hartman Profile which is a series of either four or five tasks. Upon accessing the website, a server application resident at the website provides instructions and profile tasks to the participant as indicated in logic block 502. Based on the participant's completion of the profile, the server application then computes clarities and biases for each of the dimensions and views and provides a blended score for each dimension as indicated by logic block 504. Next, as indicated in logic block 506, the server application delivers the profile results to the participant electronically. This is then followed by the server application delivering tailored training and development reminders and exercises to the participant as indicated in logic block 508. The delivery mechanism can be in the form of the portal server automatically delivering electronic mail reminders to the participant at the participant's Internet address, or by the participant accessing the portal server with a personal identification number (PIN). In decision block 510, a determination is made as to whether or not the participant has completed the training program which, in one embodiment, runs for sixteen consecutive weeks. If the training program is still in progress then the processing loops to logic block 508 where the application delivers the next tailored training and development reminder and exercise to the participant on a periodic (i.e., weekly) basis. Once the training program has been completed, as determined in decision block 510 then there is an exit from the training program as indicated by exit block 512. At this point, the participant can be awarded a certificate of completion or receive some other indication of successful completion of the training program.

Figure 6:
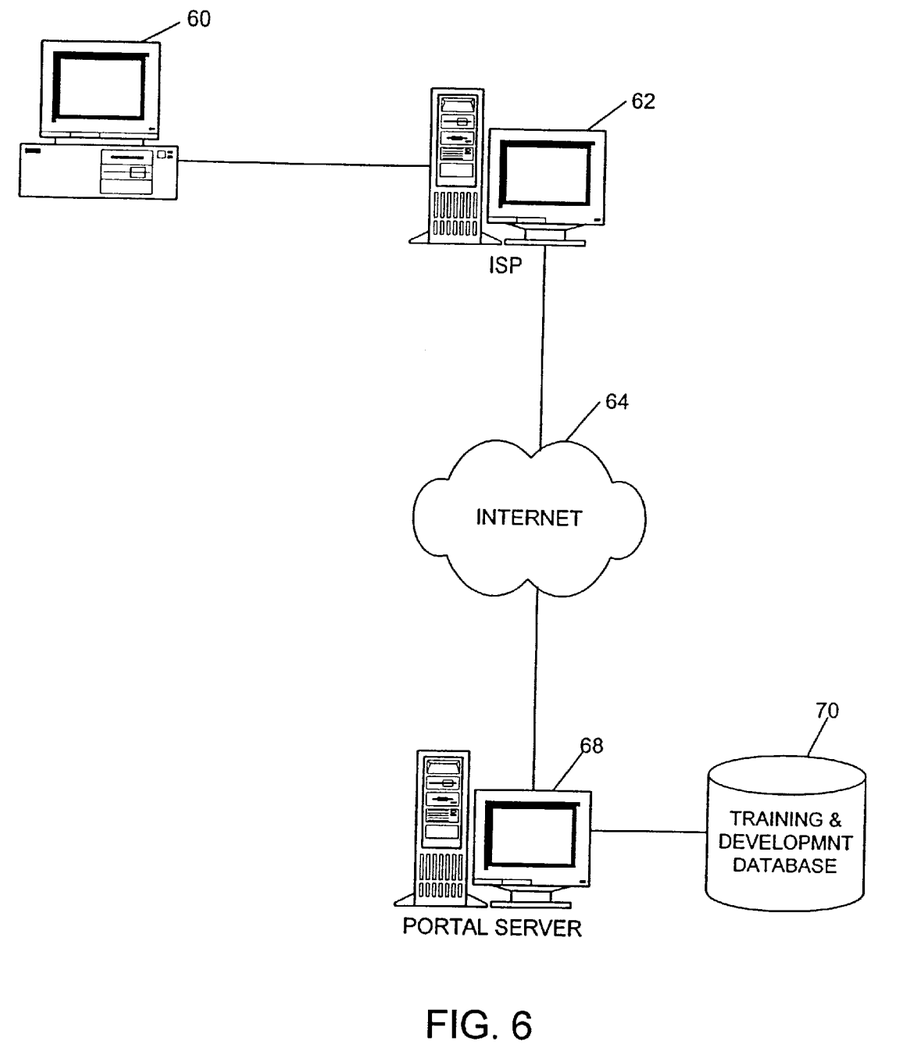
FIG. 6 depicts an environment in which a preferred embodiment of the present invention operates.

FIG. 6 illustrates an environment in which the present invention operates. A participant at desktop, laptop, or workstation 60 connects to his Internet service provider 62 to obtain an Internet connection over Internet 64 to the portal server 68. Portal server 68 stores the server application that provides the Kinsel-Hartman Profile task to the participant, determines the participant's clarities and biases, provides a detailed report back to the participant, and provides periodic training and development reminders and exercises to the participant. At the portal server 68, there is also training and development database 70 which stores all of the potential reminders and training exercises to be delivered to a participant based on his clarities and biases in each dimension and in each view.

Figure 7:
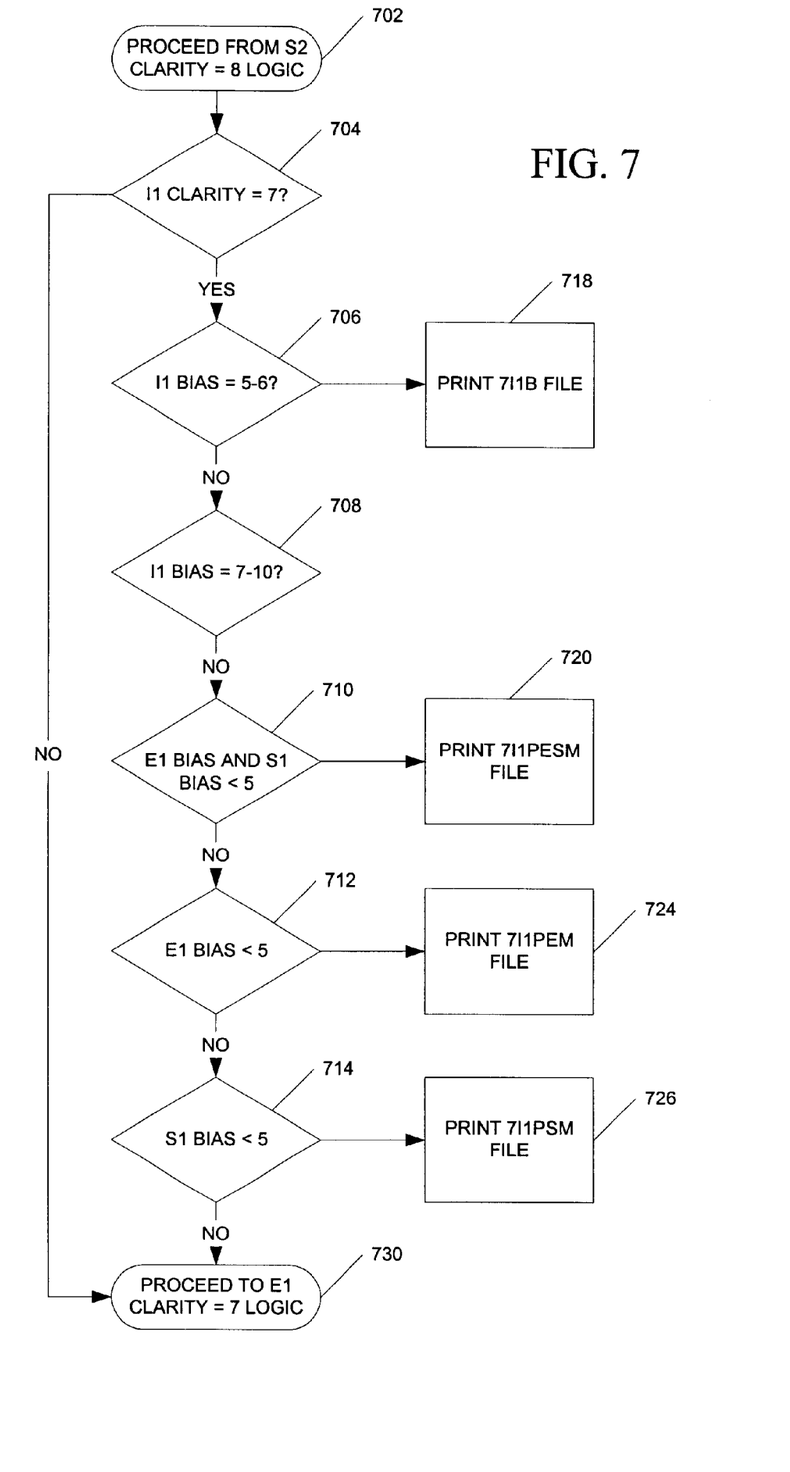
FIG. 7 illustrates a portion of the processing logic used in the generation of a profile report in accordance with a preferred embodiment of the present invention.

FIG. 7 illustrates a portion of the processing logic used in the generation of a profile report following the participant's taking of the Kinsel-Hartman Profile. The processing logic is ordered on the basis of clarity scores, sequentially processing I1, E1, S1, I2, E2 and S2 scores beginning with the highest clarities. If any of the assigned clarities corresponding to these views/dimensions is 9 or 10, then a specific file is printed on the report to describe the individual's corresponding strength. Clarities of 8 are then tested for each view and dimension in the same sequential order (I1, E1, S1, I2, E2, S2); however, now the assigned biases are also factored into determining the profile file best describing the individual's capabilities.

FIG. 7 is that portion of the processing logic that deals with an I1 (empathic thinking) clarity of 7 (very good clarity). This portion of logic is entered in connection block 702 where the logic proceeds from tests involving an S2 (self direction thinking) clarity of 8 as indicated in connection block 702. In decision block 704, a test is made to determine if the I1 clarity is equal to 7. If the I1 clarity is equal to 7, then in decision block 706 a determination as to whether or not the corresponding I1 bias equals 5 or 6 (positive bias of 41–60%). If it does, then a specific profile file (7I1B) is printed as indicated by logic block 718. Otherwise, processing continues in decision block 708 with a determination of whether or not the I1 bias equals 7–10 (positive bias>60%). If it does not, then in decision block 710 a, test is made to determine if the E1 (practical thinking) bias and the S1 (structured thinking) bias are both less than 5. If they are, then in logic block 720 the 7I1PESM file is printed. If both the E1 bias and the S1 bias are not less than 5, then in decision block 712 a test is made to determine if the E1 bias is less than 5. If it is, then in logic block 724 the 7I1PEM file is printed. If the E1 bias is greater than 5, then a test is made in decision block 714 to determine if the S1 bias is less than 5. If it is, then file 7I1PSM is printed as indicated by logic block 726. If both the E1 bias and the S1 bias are greater than 5 by negative results in decision blocks 712 and 714, respectively, then processing continues with the E1 clarity=7 logic as indicated by connector block 730. Likewise, if in decision block 704 the I1 clarity is not equal to 7, then processing drops down to connector block 730 where processing continues with the E1 (practical thinking) clarity=7 logic. Note that the actual names of the files that are printed are not significant; it is the content of the file based on the individual's thinking orientation that matters.

The personal training and development delivery system of the present invention has been described as an application program resident on a web server 68 with an associated master training and development database 70, and accessible over a public non-trusted network such as the Internet. It is important to note; however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD-ROMs, and transmission type media such as analog or digital communications links.

Additionally, the corresponding structures, materials, acts, and equivalence of all means plus functional elements in any claims or intended to include any structure, material or acts for performing the function in combination with other claimed elements as specifically claimed.

While the invention has been particular shown and described with reference to a preferred embodiment thereof, it will be understood by those skilled in the art that various other changes in form and detail may be made without departing from the spirit and the scope of the invention.

What is claimed is:

1. A personal training and development delivery system for providing systematic training and development reminders and exercises to a program participant over a communications network to reinforce the participant's strengths and to modify the participant's behavioral weaknesses, comprising:

a personal profile application program providing a user interface to enable the participant to rank a plurality of statements on each of a plurality of value tasks;

a server hosting the personal profile application program, the application program comprising processing logic that blends a clarity score and a bias score for each of a set of value dimensions and each of a set of views determined from the ranking of statements on each value task into a single set of personal profile scores that are a measure of the participant's strengths and weaknesses; and analyzes the profile scores to determine the participant's principal strengths and weaknesses; and a personal training and development database including a plurality of training and development exercises which are selected and presented to the participant in a determined order to motivate ongoing participation based on an evaluation and multivariable analysis of the participant's clarities and biases for the set of value dimensions and the set of views.

2. The personal training and development system of claim 1 wherein the communications network is the Internet.

3. The personal training and development system of claim 1 further comprising a computing system for use by the participant in accessing the server remotely over the communications network.

4. The personal training and development system of claim 3 wherein the computing system includes any one of a desktop computer, a workstation, a notebook computer, a handheld personal digital assistant, a cellular phone, and an interactive pager.

5. The personal training and development system of claim 3 wherein the computing system accesses the server by a wired connection.

6. The personal training and development system of claim 3 wherein the computing system accesses the server by a wireless connection.

7. A method for providing systematic training and development reminders and exercises to a participant in a personal training and development program that reinforce the participant's measured strengths and address the participant's weaknesses, comprising the acts of:

accessing a server hosting a personal profile application program from a personal computing system to take a value profile having a plurality of tasks to be performed interactively;

determining the participant's profile scores on a plurality of dimensions of value as a result of the participant's responses on the plurality of tasks;

automatically generating and delivering a profile report to the participant that characterizes the participant's strengths and weaknesses; and performing a multivariable analysis of the profile scores and determining a sequence of reminders and exercises for the participant based on the analysis of the profile scores, and automatically delivering the reminders and exercises periodically to motivate ongoing participation by emphasizing the participant's principal strengths and weaknesses.

8. The method for providing systematic training and development reminders of claim 7 wherein each of the plurality of tasks includes a set of statements that are ordered by the participant.

9. The method for providing systematic training and development reminders of claim 7 wherein each of the plurality of tasks measures the participant's clarities and biases on each of the plurality of dimensions of value.

10. The method for providing systematic training and development reminders of claim 7 wherein the plurality of dimensions of value include a systemic value, an extrinsic value and an intrinsic value.

11. The method for providing systematic training and development reminders of claim 10 wherein each of the dimensions of value includes a self view and a world view.

12. The method for providing systematic training and development reminders of claim 9 wherein the profile report delivered to the participant is automatically generated by determination of the participant's clarities and biases for each of the plurality of dimensions of value.

13. The method for providing systematic training and development reminders of claim 7 further comprising the act of blending the participant's clarities and biases into a composite score for each dimension of value.

14. The method for providing systematic training and development reminders of claim 13 further comprising the act of generating a tiered strength matrix based on a range of composite scores for each dimension of value.

15. The method for providing systematic training and development reminders of claim 14 further comprising the act of generating a tiered interferers to success matrix based on a range of composite scores for each dimension of value.

16. The method for providing systematic training and development reminders of claim 15 wherein the sequence of reminders and exercises is determined based on the tiered strength matrix and the tiered interferers to success matrix for each dimension of value.

17. A computer program product stored on a computer-readable medium for providing systematic training and development reminders and exercises to a participant in a personal training and development program that reinforce the participant's measured strengths and address the participant's weaknesses, comprising:

program instructions that enable access to a server hosting a personal profile application program from a personal computing system to take a value profile having a plurality of tasks to be performed interactively;

program instructions that determine the participant's profile scores on a plurality of dimensions of value as a result of the participant's responses on the plurality of tasks;

program instructions that automatically generate and deliver a profile report to the participant that describes the participant's strengths and weaknesses; and program instructions that perform a multivariable analysis of the profile scores and determine a sequence of reminders and exercises for the participant based on the analysis of the profile scores, and automatically deliver the reminders and exercises periodically to motivate ongoing participation by emphasizing the participant's principal strengths and weaknesses.

18. The computer program product for providing systematic training and development reminders of claim 17 wherein each of the plurality of tasks includes a set of statements that are ordered by the participant.

19. The computer program product for providing systematic training and development reminders of claim 17 wherein each of the plurality of tasks measures the participant's clarities and biases on each of the plurality of dimensions of value.

20. The computer program product for providing systematic training and development reminders of claim 17 wherein the plurality of dimensions of value include a systemic value, an extrinsic value and an intrinsic value.

21. The computer program product for providing systematic training and development reminders of claim 20 wherein each of the dimensions of value includes a self view and a world view.

22. The computer program product for providing systematic training and development reminders of claim 19 further comprising program instructions that automatically generate a profile report by determination of the participant's clarities and biases for each of the plurality of dimensions of value.

23. The computer program product for providing systematic training and development reminders of claim 17 further comprising program instructions that blend the participant's clarities and biases into a composite score for each dimension of value.

24. The computer program product for providing systematic training and development reminders of claim 23 further comprising program instructions that generate a tiered strength matrix based on a range of composite scores for each dimension of value.

25. The computer program product for providing systematic training and development reminders of claim 24 further comprising program instructions that generate a tiered interferers to success matrix based on a range of composite scores for each dimension of value.

26. The computer program product for providing systematic training and development reminders of claim 25 further comprising program instructions that determine the sequence of reminders and exercises based on the tiered strength matrix and the tiered interferers to success matrix for each dimension of value.

* * * * *